(No Model.)
E. L. MORRIS.
Toy Money Box.
No. 230,713.　　　　　　　　　　Patented Aug. 3, 1880.
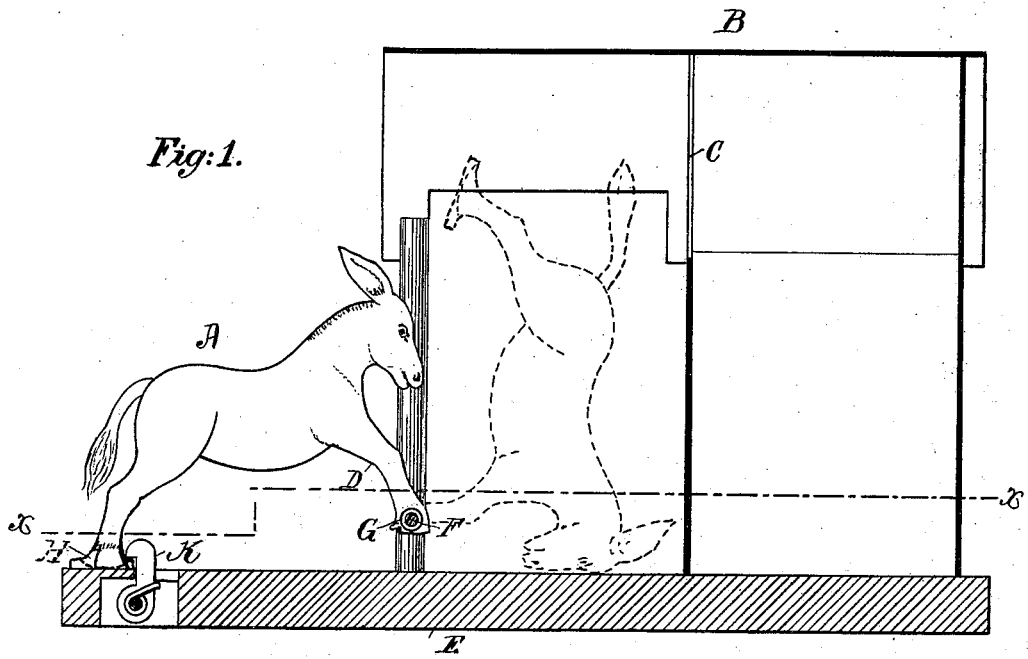
Fig: 1.
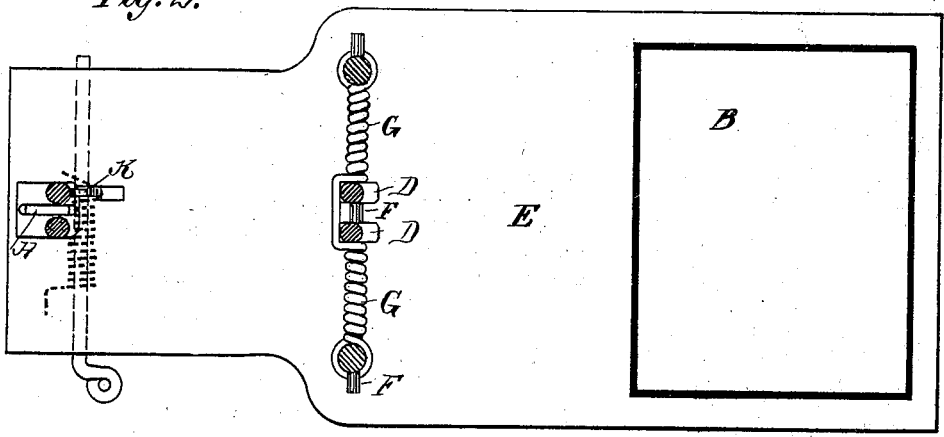
Fig: 2.
Witnesses:
Edwin W. Brown
W. S. Bellows
Inventor,
Edward L. Morris.
N. PETERS, PHOTO-LITHOGRAPHER, WASHINGTON, D. C.

UNITED STATES PATENT OFFICE.

EDWARD L. MORRIS, OF BOSTON, MASSACHUSETTS.

TOY MONEY-BOX.

SPECIFICATION forming part of Letters Patent No. 230,713, dated August 3, 1880.

Application filed April 19, 1880. (No model.)

*To all whom it may concern:*

Be it known that I, EDWARD L. MORRIS, of Boston, in the county of Suffolk and State of Massachusetts, have invented a new and useful Improvement in Toys, of which the following is a specification.

My invention relates to an improved toy savings-bank; and it consists, first, of the figure of a plunging or tumbling animal, which is caused to revolve upon a pivot passing through the lower extremities of its front legs, the said front legs being acted upon by means of a suitable spring; and, second, of a receptacle into which coin may be thrown by the movements of the said animal.

I am aware that a "kicking animal" has been before used for the purposes of a savings-bank—as, for instance, in Letters Patent No. 223,293, granted me January 6, 1880; but my present invention differs from all others in that the front legs of the performing animal are made movable as regards their base, and are fixed firmly to the body, thus carrying the entire body forward when operated by the spring, and imitating the acts of springing, plunging, and tumbling.

In the accompanying plate of drawings my improved toy is illustrated, Figure 1 being a longitudinal vertical section of the same, and Fig. 2 a horizontal section on line $xx$ of Fig. 1.

A represents the figure of a toy animal whose front legs, D, are pivoted to the rod F, which passes loosely through the feet of the animal and is fixed firmly to proper bearings upon the base, E. A spring, G, is coiled about the rod F, and, passing back of the front legs, D, is made to exert a pressure which throws the legs forward when in action. A hook or catch, K, holds the heels of the animal down to the base E. A niche H is provided between the heels of the animal for the purpose of holding coin which may be placed loosely therein.

A coin-receptacle, B, having an opening, C, is placed at a proper distance in front of the animal A, so that, placing a coin loosely in the niche H and releasing the hook or catch K, the front legs, D, are thrown violently forward upon their pivot F by the action of the spring G, and the body of the animal A coming to a sudden stop in front of the opening C, as shown by the dotted lines in Fig. 1, the coin passes out from the niche H and, entering the opening C, disappears within the receptacle B.

Having thus described my invention, what I claim, and desire to secure by Letters Patent, is—

In a toy money-box, the animal A, having its front legs, D, pivoted to the rod F, affixed to bearings upon the base E, in combination with the spring G, operating against the front legs, D, and the catch K, for releasing the hind legs, whereby the heels of the animal are thrown upward, substantially as described.

EDWARD L. MORRIS.

Witnesses:
EDWIN W. BROWN,
WM. S. BELLOWS.